UNITED STATES PATENT OFFICE.

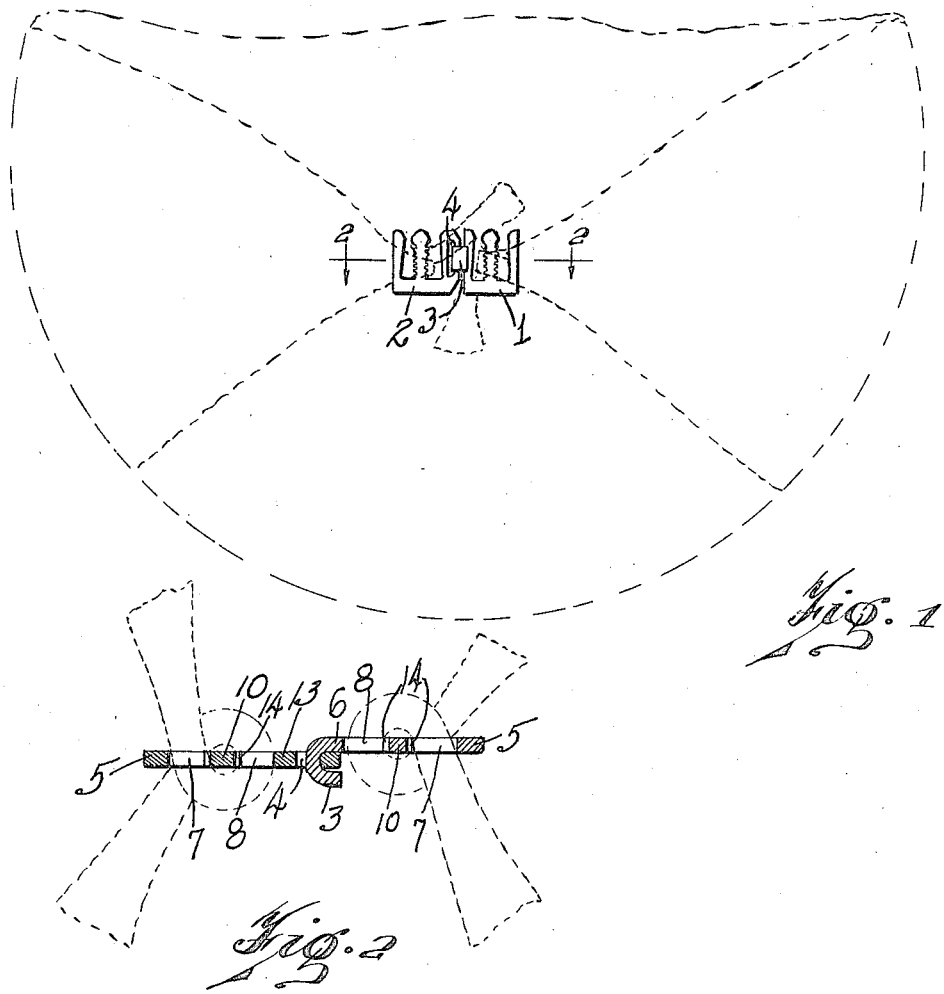
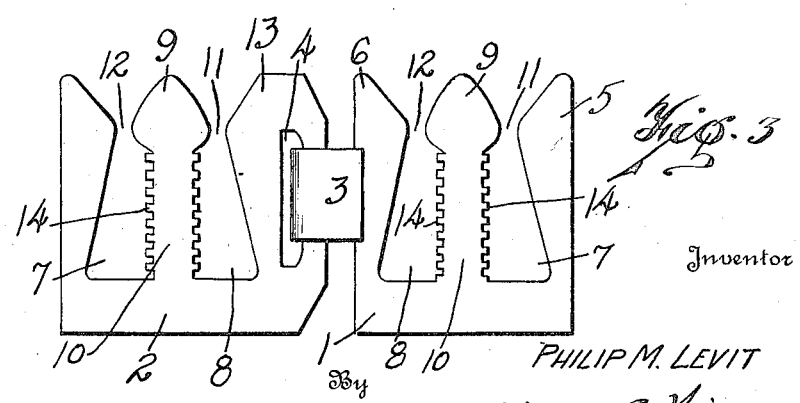

PHILIP M. LEVIT, OF CHICAGO, ILLINOIS.

VEIL-FASTENING DEVICE.

1,386,788.  Specification of Letters Patent.  Patented Aug. 9, 1921.

Application filed October 11, 1920. Serial No. 416,082.

*To all whom it may concern:*

Be it known that I, PHILIP M. LEVIT, a citizen of the United States, residing at Chicago, county of Cook, State of Illinois, have invented a certain new and useful Improvement in Veil-Fastening Devices, and declare the following to be a full, clear, and exact description of the same, such as will enable others skilled in the art to which it pertains to make and use the same, reference being had to the accompanying drawings, which form a part of this specification.

This invention relates to a veil fastening device and the object of the invention is to provide a device of the character described formed of two parts to which the opposite ends of the veil may be secured. An additional object of the invention is a veil fastening device formed of two parts each of which may be adjustably secured at any predetermined point throughout the length of the veil according to the length of veil desired to be used and which are adapted to be hooked together. An additional object of the invention is to provide a veil fastening device by which the necessity of tying the veil may be eliminated. As will be well understood a veil after being tied in a hard knot is not only undone with great difficulty but the veil is frequently torn and sometimes tangled by thus being tied. By tying the veil the life thereof is very greatly shortened and the appearance of the veil is greatly distorted besides requiring considerable time to tie and untie the veil each time it is used. The principal object of this invention is, therefore, to provide a veil fastening device by means of which the opposite ends of the veil may be easily hooked together or unhooked thereby saving time and preventing damage to the veil. These objects and several novel features of the invention are hereinafter more fully described and claimed and the preferred form of construction is shown in the accompanying drawings in which—

Figure 1 is an elevation of the device the veil being indicated as secured thereto by dotted lines.

Fig. 2 is an enlarged section taken on line 2—2 of Fig. 1.

Fig. 3 is a greatly enlarged elevation thereof.

The device is preferably formed of celluloid, bone, metal or other suitable material and consists of a hook member 1 and, what may be termed an eye member 2, the member 1 being provided with a hook 3 extending therefrom and through the eye 4 in the member 2. The hook member 1 is provided with two upwardly extending prongs 5 and 6 and the inner faces of each prong extending downwardly at an angle to the vertical thereby providing enlarged notches 7 and 8 beneath the head 9. As will be noted from the figures the head 9 is a part of the upwardly extending prong or shank 10 which is corrugated or toothed on each side. As will be noted from the figures the head 9 is enlarged and of such shape as to provide restricted slots at 11 and 12 through which the veil must be passed before being wrapped about the toothed shank 10. The prongs 5 and 6 are provided with beveled upper ends on each inner face thereof, the said bevel in combination with the peculiar shape of the head 9, providing a guide by means of which the veil may be guided through the restricted slots into the enlarged notches 7 and 8. The member 2 is similar to the member 1 with the exception that the prong 13 thereof is made of greater width than the prong 6 of the member 1 which carries the hook 3. By forming the member 13 of greater width an aperture 4 may be formed therein through which the hook member 3 may be passed to hook the two members together.

To secure the veil to the device one end of the veil is secured to the hook member and the opposite end of the veil is secured to the eye member. To secure the veil to either member it is gathered together to as small a diameter as possible at the point where it is to be passed through the restricted slots 11 and 12 and this veil is wound in one complete turn about the toothed prong 10, the teeth 14 on the shank thereof engaging the different strands of the veil and thereby holding the veil from slipping. The veil is secured to the member 2 in an identical manner and when each end of the veil has been secured to one of the members 1 or 2 the ends of the veil are hooked together by passing the hook 3 of the member 1 through the eye 4 of the member 2. It can thus be seen that either of the members 1 or 2 may be secured at any point throughout the length of the veil, depending upon at what length the veil is desired to be used. In Fig. 1 I have indicated in dotted lines a card or disk about which the veil may be stretched to indicate the appearance of the device when assembled and used with the veil.

From the foregoing description it becomes evident that the device is of a very simple nature, is of cheap construction, is very efficient in operation and accomplishes the purposes desired.

Having thus briefly described my invention, its utility and mode of operation what I claim and desire to secure by Letters Patent of the United States is—

1. In a veil fastening device, a hook member, an eye member, a pair of prongs on each member, a post between each pair of prongs, the construction permitting the veil to be wound about each post, and teeth on the post adapted to hold the veil from slipping.

2. In a veil fastening device, a hook member, an eye member, a post on each hook and eye member about which the veil may be wound, said post having an enlarged end portion of substantially triangular shape, a prong on each side of the post of each member of substantially the same length as the post, the inner faces thereof at the ends being beveled at an angle opposite to that of the adjacent face of the post end.

3. In a veil fastening device, a three-pronged member, the center prong about which the veil may be wound being provided with a head, teeth on the said center prong preventing slippage of the veil when in position, the outer prongs being provided with beveled inner faces at the end providing in combination with the center prong a guide for positioning the veil on the center prong, a hook on the said member, and a second member similar to the first named member having an aperture through which the hook may be passed.

4. In a veil fastening device, a pair of members each provided with three parallel extending prongs, the center prong being provided with a toothed shank, a head thereon larger than the shank thereof and tapered practically to a point, the outer prong being beveled on the inner side at an angle to the adjacent side of the head providing, in combination with the head, a guide by means of which the veil may be passed to the shank of the center prong.

In testimony whereof, I sign this specification.

PHILIP M. LEVIT.